United States Patent [19]

Takagi

[11] Patent Number: 4,757,448
[45] Date of Patent: Jul. 12, 1988

[54] ELECTRONIC CASH REGISTER

[75] Inventor: Hiroshi Takagi, Kyoto, Japan

[73] Assignee: Omron Tateisi Electronics Co., Kyoto, Japan

[21] Appl. No.: 923,263

[22] Filed: Oct. 27, 1986

[30] Foreign Application Priority Data

Oct. 25, 1985 [JP] Japan ................ 60-239760

[51] Int. Cl.⁴ .............................. G06F 15/00
[52] U.S. Cl. ...................... 364/405; 364/404
[58] Field of Search ................. 364/404, 405

[56] References Cited

U.S. PATENT DOCUMENTS 4,419,738 12/1983 Takahashi et al. ............... 364/405
4,430,713 2/1984 Nakatani et al. ................. 364/405
4,518,852 5/1985 Stockburger et al. ............ 364/405

Primary Examiner—Michael R. Fleming
Assistant Examiner—Allen MacDonald
Attorney, Agent, or Firm—Stevens, Davis, Miller & Mosher

[57] ABSTRACT

An electronic cash register employing a price-look-up table includes a detachable recording medium for recording item codes and the corresponding item prices, and a reader for reading the data from the detachable recording medium. During a transaction operation, the recording medium is checked to determine whether it is connected to the reader, and, if it is, the detachable recording medium is searched for an item involved in the transaction operation. If that item is present on the detachable recording medium a transaction operation based on the medium-recorded prices for that item, rather than a previously stored price for that item, is carried out.

8 Claims, 3 Drawing Sheets

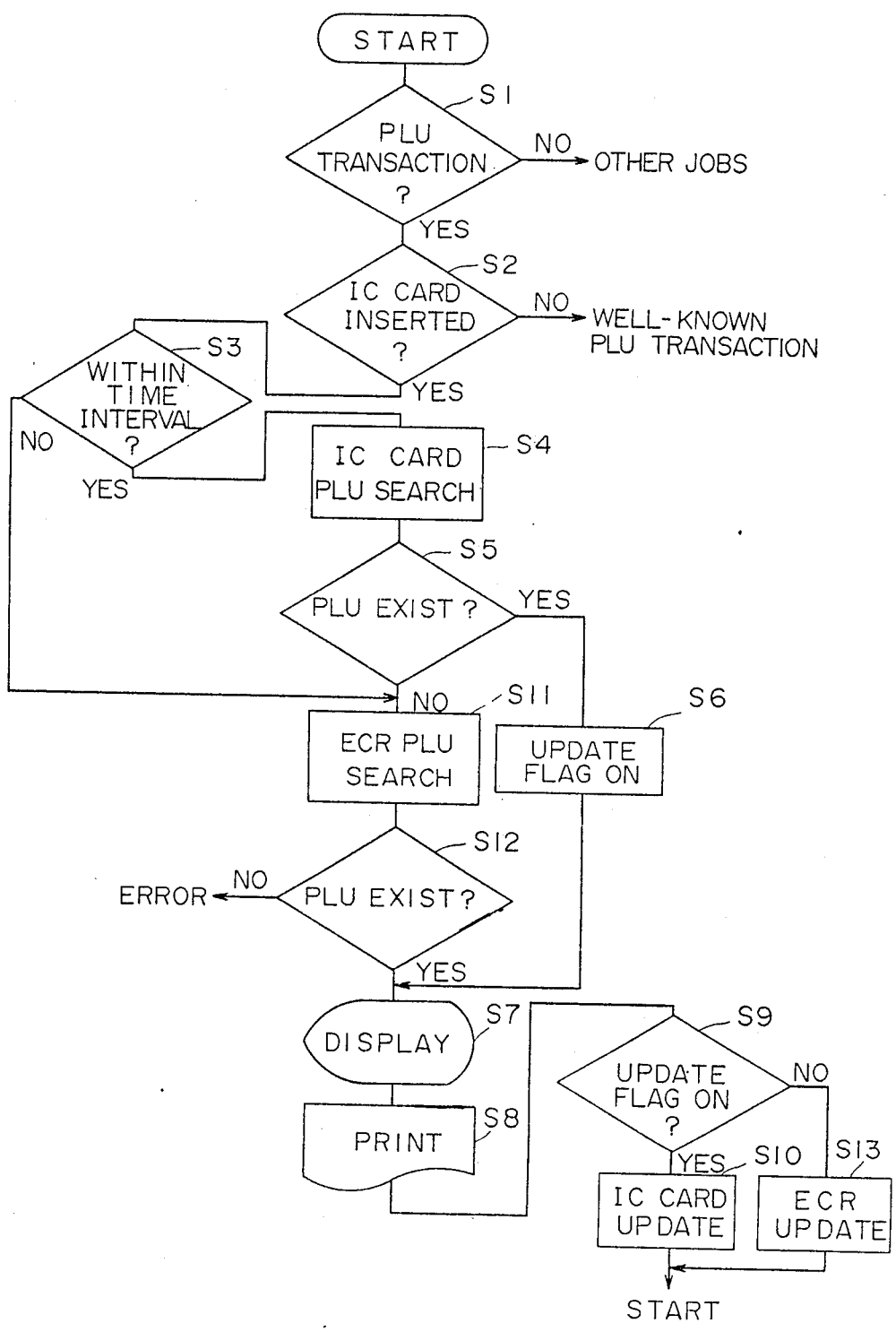

ELECTRONIC CASH REGISTER

FIELD OF THE INVENTION

This invention relates to an electronic cash register (ECR), and more particularly to an ECR for use with a price-look-up table (PLU table) storing item prices.

BACKGROUND OF THE INVENTION

It is well known that item prices are often changed for various reasons in many retail shops such as supermarkets. For instance, some foods are often discounted unless sold out in short periods of time, because such foods are likely to lose their value. There are also a number of cases in which some designated items are sold at bargain prices during certain intervals during a day.

For this puropose, heretofore, some ECRs have been provided with PLU tables where item prices are changeably stored, while others have been provided with PLU tables storing a plurality of prices with respect to each item so that the item prices are changeable by selecting one of the stored prices.

The ECRs described above, however, have the following disadvantages:

1. In the former type, operation of the ECRs must be temporarily stopped each time there is a need for changing the prices stored in the PLU tables, so that the operation efficiency is lowered.

2. In the latter type, each item is required to hold its corresponding price because all the prices are changed at one time irrespective of items, so that extra memory location is required with respect to even such items which are not incurring a change in price.

SUMMARY OF THE INVENTION

It is, accordingly, a primary object of this invention to provide an ECR which overcomes the above-mentioned disadvantages.

It is another object to provide an ECR which is capable of changing the item prices without changing the prices stored in the PLU table, i.e., the item prices can be selectively changed temporarily without altering the long-term prices stored in the PLU table.

It is still another object to provide an ECR which is capable of changing the item prices without the necessity of stopping operation of the ECR.

It is a further object to provide an ECR which is capable of changing the item prices without providing each item of the PLU table with its corresponding price.

It is a still further object to provide an ECR which is capable of distinguishing between transaction data subject to changed prices and transaction data which involve items with unchanged prices.

It is a still further object to provide an ECR which is capable of temporarily and selectively changing the item prices during a given interval of time so that the price will automatically revert back to the long-term prices after the given interval has elapsed.

According to one aspect of this invention, there is provided an ECR comprising a recording medium storing item codes and the corresponding prices, a reader for reading the prices stored in the recording medium which is detachably connected to the reader, a keyboard for entering the item data in a transaction operation, check means for checking whether the recording medium is connected to the reader during the transaction operation, and a controller for transacting the item data entered by the keyboard on the basis of the prices read out of the recording medium, provided that the check means indicates that the recording medium is connected to the reader.

Other objects and numerous advantages of the ECR according to this invention will become apparent from the following description when considered in conjunction with the accompanying drawings.

BRIEF DESCRIPTION OF THE DRAWINGS

FIG. 4 is a flowchart illustrating the operation of the ECR of FIG. 1.

DETAILED DESCRIPTION OF THE INVENTION

Figure 1:
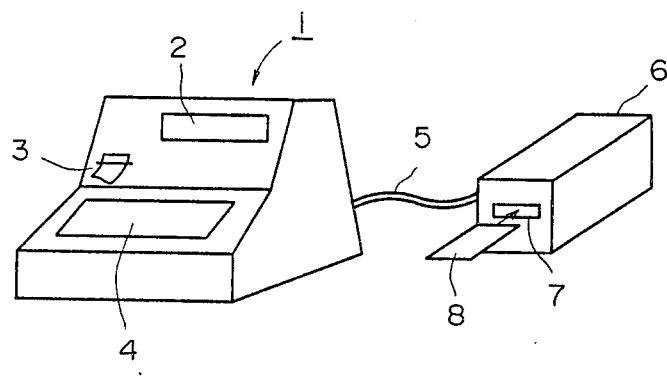
FIG. 1 is a perspective view showing the appearance of all of the components of the ECR of this invention.

In FIG. 1, there is shown a perspective view of an ECR which includes a main body 1 and a card reader 6. The main body 1 comprises a display 2, a printer 3, and a keyboard 4. The card reader 6 electrically connected to the main body 1 has an opening 7 into which an IC card 8 is inserted.

Figure 2:
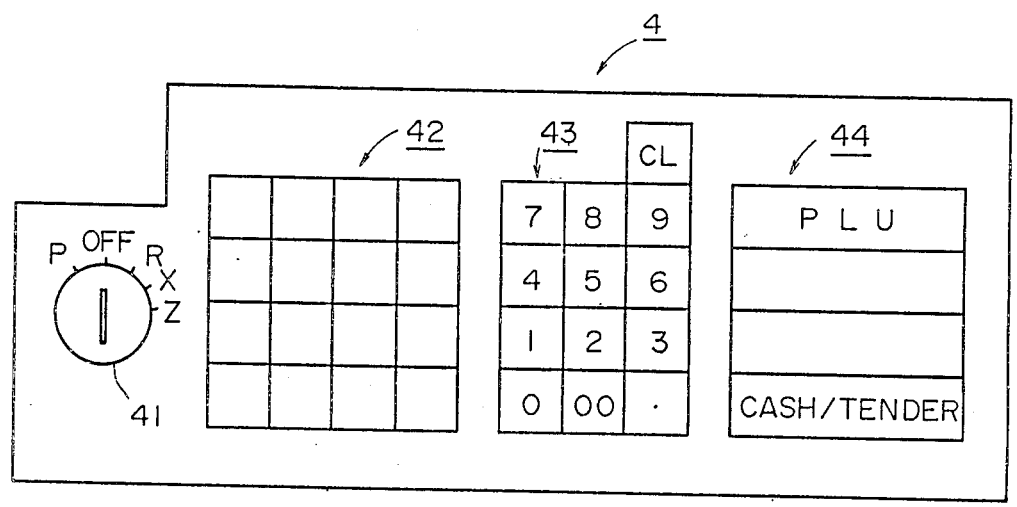
FIG. 2 is a plan view showing the key layout of the keyboard of FIG. 1.

As shown in FIG. 2, the keyboard 4 is provided with a mode switch 41 for selecting the operation modes of the ECR, department keys 42 for entering the department codes of items, numeral keys 43 for entering numeral data, and various functional keys 44.

Figure 3:
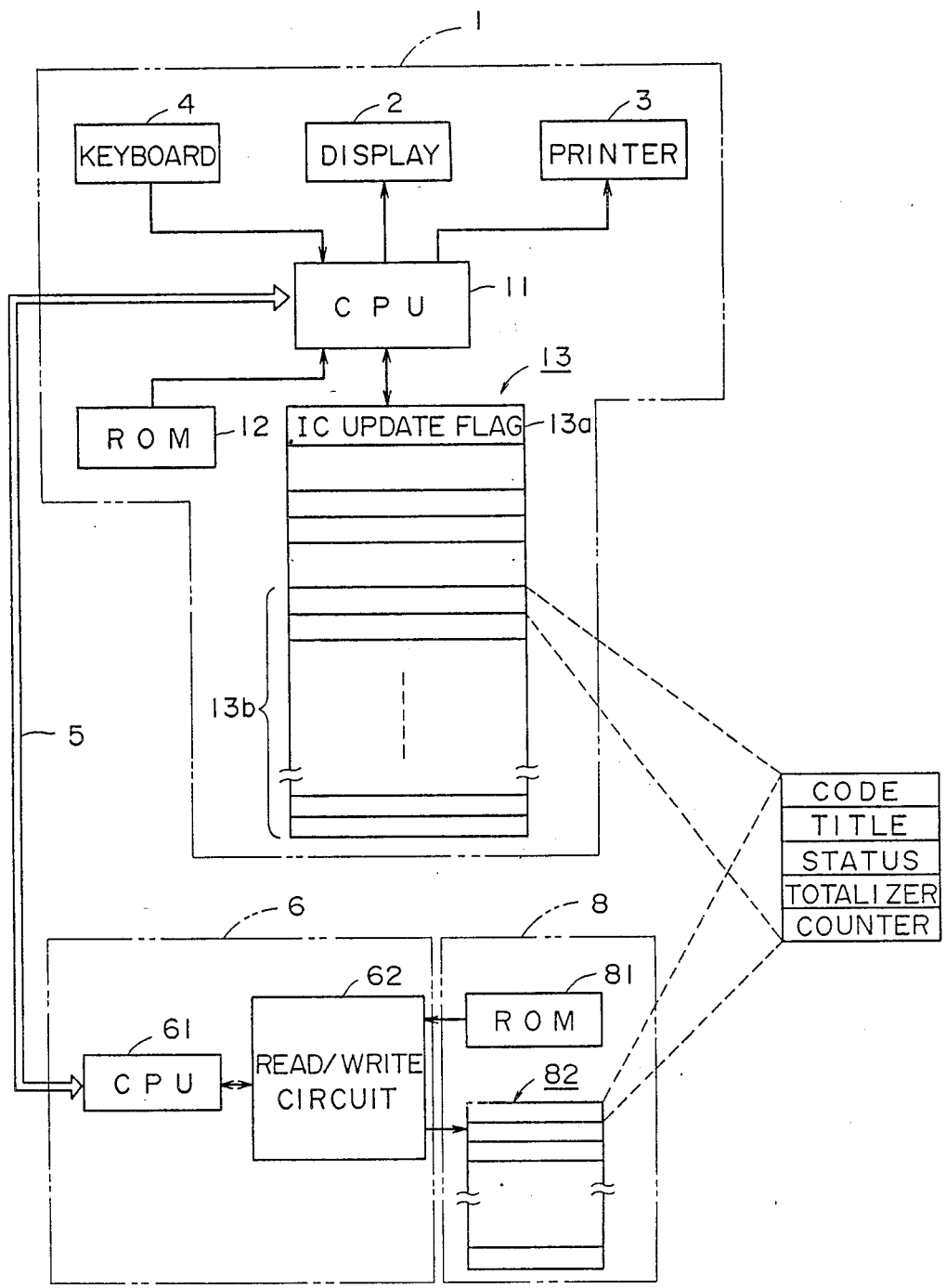
FIG. 3 is a block diagram showing the construction of the ECR of FIG. 1.

A block diagram of the system of FIG. 1 is shown in FIG. 3. The main body 1 includes a CPU 11 with which display 2, printer 3, keyboard 4, ROM 12 and RAM 13 are interfaced. The ROM 12 has stored therein an operation program as shown in FIG. 4. The RAM 13 stores various data required for the data processing of the CPU 11, and further includes areas 13a and 13b featuring this embodiment.

The area 13a is used as an IC card update flag which is normally maintained in a reset state, however, this flag is switched to a set state at the moment when transaction data are written into the IC card 8. The area 13b is used as a data area for storing therein the transaction data associated with the various items. Further, a PLU table containing the prices of the various items is stored either in ROM 12 or RAM 13.

The card reader 6 contains a CPU 61 and a read/write circuit 62 connected thereto. The CPU 61 is interfaced with CPU 11 in main body 1 through data transmission line 5. The CPU 61 directly controls the operation of read/write circuit 62 on the basis of the instructions given by CPU 11.

The IC card 8 contains ROM 81 and RAM 82. The ROM 81 has stored therein the item codes associated with items whose corresponding prices are required to be temporarily changed. Such item codes are accompanied by the changed prices respectively. In addition, the ROM 81 has stored therein a "time interval" during which the changed prices provided by the IC card can be applied for a transaction.

The RAM 82 is used as a data area for storing the transaction data associated with the various items. The transaction data storing areas such as 13b and 82 are divided into a multiple number of partitions corresponding to the items, each of which is provided with the item code, an item title, status, a totalizer for storing the total monetary sale amount of the item, and a counter for counting the number of unit sales of the item as shown in FIG. 3.

FIG. 4 is a flowchart illustrating the operation of the CPU 11 as shown in FIG. 3. In step S1, it is inquired whether the transaction operation is carried out with keyboard 4 referring to the PLU table. Unless this operation is carried out, the CPU will advance to other jobs which are irrelevant to this invention and not described here.

If an operation referring to the PLU table takes place, the CPU advances to step S2 in which it is inquired whether the IC card 8 is inserted in card reader 6. Unless the IC card 8 is inserted, a type of PLU transaction such as is used in conventional ECRs is carried out, which is well-known and not described herein.

If the IC card 8 is inserted in step S2, the CPU advances to step S3 where it is inquired whether the present time is within the time interval provided by the IC card.

If yes, the ROM 81 of the IC card 8 is searched to determine whether the item code involved in the transaction is preset in the IC card in steps S4 and S5. If the item code in question is found in the ROM 81, the IC card update flag 13a is set in step S6 and the corresponding price also stored in the ROM 81 is read out through read/write circuit 62. The price is shown at display 2 (step S7). The transaction data such as the item title and price are printed out by printer 3 (step S8).

In step S9, it is inquired whether the IC card update flag is set. In this case, the flag has been set in step 6, so that the transaction data are updated in transaction data area 82 of IC card 8. More specifically, the total monetary sale amount stored in the totalizer is increased by the item price, while the item counter is incremented by one (step 10). It is noted that the transaction data are not updated in transaction data area 13b of RAM 13.

In step S3, unless the present time is within the time interval provided by the IC card, the operational steps which follow are the same as those carried out by conventional ECRs. Namely, the PLU table of ECR main body 1 is searched to determine whether the item code involved in the transaction is located therein (steps 11 and 12). If the item code is found, the corresponding price is displayed (step S7) and printed out by printer 3 together with the item title (step S8), as previously described.

In this case, the IC card update flag is not set, so that the transaction data are updated in transaction data area 13b of ECR main body 1 (step S13). If the item code cannot be found in steps 11 and 12, the CPU advances to an error routine (which is conventional and not shown). Further, in step S5, if the item code cannot be found in ROM 81 of the IC card, the transaction is carried out by using the PLU table of ECR main body 1 (step S11).

In this way, the price of any item can be temporarily changed by inserting the IC card into the card reader 6 without changing the PLU table of the ECR main body 1. Moreover, the transaction data which are handled by the use of the price data preset in the card are updated in the transaction data area 82 of the card, so that the transaction data on the basis of the temporarily changed item prices can be distinguished during data management from transaction data not subject to changed prices.

With regard to the medium for providing the temporarily changed item prices and transaction data area, other media such as a floppy disk and cassette tape can also be used, provided that such media are detachably connectable with respect to the ECR main body and can hold data to enable reading therefrom and writing thereinto.

It should be understood that the above description is merely illustrative of this invention and that many changes and modifications may be made without departing from the scope of the appended claims.

What is claimed is:

1. An electronic cash register with a price-look-up storing item prices, comprising:
   a recording medium storing an item code and a corresponding price associated with that item code;
   read means for reading the price from said recording medium, said recording medium being detachably connected to said read means;
   a keyboard for entering item data into said electronic cash register in a transaction operation;
   check means for checking whether said recording medium is connected to said read means during said transaction operation; and
   control means for controlling processing of said item data entered by said keyboard based on a price read out of said recording medium by said read means, responsive to an indication by said check means that said recording medium is connected to said read means.

2. An electronic cash register according to claim 1, wherein said control means controls processing of said item data based on a price stored in said price-look-up table, responsive to an indication by said check means that said recording medium is not connected to said read means.

3. An electronic cash register according to claim 1, wherein said recording medium is further provided with means for storing data indicating an interval of time when the price stored in said recording medium is available in said transaction operation.

4. An electronic cash register according to claim 1, wherein said recording medium is an IC card.

5. An electronic cash register with a price-look-up table storing item prices, comprising:
   a recording medium storing an item code and a corresponding price associated with that item code, said recording medium having an area for storing transaction data corresponding to the item code;
   read/write means for writing and reading data in and out of said recording medium, said recording medium being detachably connected to said recording medium;
   a keyboard for entering item data in a transaction operation;
   check means for checking wether said recording medium is connected to said read/write means in said transaction operation; and
   control means for controlling processing of said item data entered by said keyboard based on a price read out of said recording medium by said read/write means, responsive to an indication by said check means that said recording medium is connected to said read/write means, so that the transaction data are written into said area of the recording medium by said read/write means.

6. An electronic cash register according to claim 5, wherein said control means controls processing of said item data entered by said keyboard based on a price stored in said price-look-up table to write said transaction data into said electronic cash register, responsive to an indication by said check means that said recording medium is not connected to said read/write means.

7. An electronic cash register according to claim 5, wherein said recording medium is further provided with means for storing data indicating an interval of time when the price stored in said recording medium is available in said transaction operation.

8. An electronic cash register according to claim 5, wherein said recording medium is an IC card.

* * * * *